United States Patent
Purushothaman (10) Patent No.: US 10,481,890 B2
(45) Date of Patent: *Nov. 19, 2019

(54) ENVIRONMENT MAPPING AND PATCHING SYNTHESIS

(71) Applicant: Bank of America Corporation, Charlotte, NC (US)

(72) Inventor: Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,830

(22) Filed: Mar. 1, 2019

(65) Prior Publication Data

US 2019/0196803 A1    Jun. 27, 2019

Related U.S. Application Data

(63) Continuation of application No. 15/827,010, filed on Nov. 30, 2017, now Pat. No. 10,261,771.

(51) Int. Cl.
| | |
|---|---|
| *G06F 8/61* | (2018.01) |
| *G06F 8/65* | (2018.01) |
| *G06F 9/455* | (2018.01) |
| *G06F 11/14* | (2006.01) |

(52) U.S. Cl.
CPC .............. *G06F 8/61* (2013.01); *G06F 8/65* (2013.01); *G06F 9/455* (2013.01); *G06F 11/14* (2013.01)

(58) Field of Classification Search
CPC ..... G06F 8/61; G06F 8/63; G06F 8/65; G06F 8/656; G06F 8/658; G06F 8/67; G06F 8/68; G06F 8/71; G06F 9/445; G06F 9/455; G06F 9/45533; G06F 9/5077; G06F 11/14; G06F 11/1484; G06F 11/2056; G06F 11/2058; G06F 11/3093; G06F 11/34; G06F 11/3442; G06F 11/3447; G06F 17/30002; G06F 17/30174; G06F 17/30345; G06F 17/30368; G06F 17/30371; G06F 17/30374; G06F 17/30383; G06F 17/30424; G06F 17/30595
USPC ....................................................... 717/174
See application file for complete search history.

(56) References Cited

U.S. PATENT DOCUMENTS

| | | |
|---|---|---|
| 7,552,430 B2 | 6/2009 | Napier et al. |
| 7,975,264 B2 | 7/2011 | Sriram et al. |
| 8,065,672 B2 | 11/2011 | Sriram et al. |
| 8,205,195 B2 | 6/2012 | Wagner et al. |
| 8,291,407 B2 | 10/2012 | Greenwood et al. |
| 8,434,077 B2 | 4/2013 | Chess et al. |

(Continued)

*Primary Examiner* — Wei Y Zhen
*Assistant Examiner* — Mohammed N Huda
(74) *Attorney, Agent, or Firm* — Weiss & Arons LLP; Michael A. Springs, Esq.

(57) ABSTRACT

Method and apparatus for a system to efficiently and with limited disruption of overall activities, install software patches into a target application. The system maps out segments comprising the various system units that interact with the target application and that may be impacted by the patch. A model simulates various possible alternatives for deactivating none, one, some or all of the various units of the segment in identification of an optimal patching strategy. Implementation of the optimal strategy results in efficient patching with minimal disruption of system activities.

21 Claims, 6 Drawing Sheets

(56) References Cited

U.S. PATENT DOCUMENTS

| | | |
|---|---|---|
| 9,077,627 B2 | 7/2015 | Bonas |
| 9,442,696 B1 * | 9/2016 | Koh et al. ................ G06F 8/34 |
| 9,448,784 B2 | 9/2016 | Buzaski et al. |
| 2015/0081910 A1 * | 3/2015 | Assuncao et al. .... G06F 9/5055 |
| | | 709/226 |

* cited by examiner

ENVIRONMENT MAPPING AND PATCHING SYNTHESIS

CROSS REFERENCE TO RELATED APPLICATION

This application is a continuation of U.S. patent application Ser. No. 15/827,010 filed on Nov. 30, 2017 and entitled "ENVIRONMENT MAPPING AND PATCHING SYNTHESIS" which is hereby incorporated by reference herein in its entirety.

FIELD OF TECHNOLOGY

This disclosure relates to enhancing performance of a computer system. Specifically, the disclosure relates to enhancing the performance of updating portions of software applications.

BACKGROUND OF THE DISCLOSURE

Patching is a process of updating a portion of execution code of a software application with newer execution code. An update is typically implemented to support the application, to update it, or to repair a defect or other impairment of the application (colloquially known as "bugs"). Examples of purposes of patches include redressing security vulnerabilities, rectifying logic errors, and streamlining code or logic to improve efficiency.

Although intended to improve the software application by addressing existing problems, patching itself may result in additional problems. Patching typically involves deactivating the software application and other related systems, resulting in productivity loss through downtime. Additionally, code of a patch can be deficient relative to taking into account all the specific unique hardware and software interactions addressed by a prior version of the application. As a result, there is clear utility in, and benefit from, novel methods and apparatuses for efficiently introducing software patches into software applications.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

For the purposes of this disclosure, like reference numerals in the figures shall refer to like features unless otherwise indicated. The drawings are only an exemplification of the principles of the invention and are not intended to limit the disclosure to the particular embodiments illustrated.

BRIEF SUMMARY

To satisfy the long-felt needs and unsolved difficulties identified above, at least one embodiment may be directed toward an apparatus and/or a system for executing a computing application. The apparatus and/or system may include a device. The apparatus and/or system may include method/process steps. The device may be used to perform one or more of the steps. The device may include executable code embodied in a non-transitory computer readable medium. The code, when executed, may be configured to drive executions of a plurality of software applications. The software applications may reside and/or run within a plurality of hierarchical layers. The hierarchical layers may include a client facing layer. The hierarchical layers may include a runtime layer. The hierarchical layers may include a webserver layer. The hierarchical layers may include a middleware layer. The hierarchical layers may include a database layer. The hierarchical layers may include a virtual layer. The hierarchical layers may include an operating system layer. The hierarchical layers may include any suitable layer. Any suitable layer may include a firmware layer. Any suitable layer may include a machine code layer. The hierarchical layers may include any combination of the preceding layers.

The device may be configured to perform a dynamic software patch installation. The installation may identify a single target application selected from the software applications. The target application may include execution code.

The installation may create a segment. As used hereinafter, the term "segment" may define which of each of the software applications is called by the target application over the course of a pre-defined period of time. Each such software application may be termed a unit of the segment. Each such software application, other than the target application, may be termed a unit of the segment. The target application of the segment may not be termed a unit of the segment. Being called may include being directly called by the target application. Being called may include being called as a result of a direct call by the target application to an application other than the software application of the unit. The unit may include information about when the software application of the unit is called.

The installation may identify an optimal time. As used hereinafter, the term "optimal time" may include at least one time interval during which a minimum number of units will be altered by disabling the target application. The optimal time may include at least one time interval during which no unit will be altered by disabling the target application. The installation may perform a simulation of a replacement of the execution code. The installation may perform the simulation on each of the units of the segment. The installation may perform the simulation on all the units of the segment. The installation may generate an impact analysis quantifying a deviation from pre-determined parameters that would be caused by the replacement of the execution code. The installation may generate the impact analysis on the basis of the simulation.

The installation may disable the target application during the optimal time. The installation may disable the target application during the optimal time when the impact analysis returns a deviation from the pre-determined parameters that is below a pre-determined threshold. The installation may disable the target application during the optimal time only if the deviation from the pre-determined parameters is below the pre-determined threshold.

The installation may replace execution code within the target application with different execution code during the optimal time. The installation may replace execution code within the target application with different execution code during the optimal time when the target application is disabled. The installation may replace execution code within the target application with different execution code during the optimal time when the deviation from the pre-determined parameters is below a pre-determined threshold. The installation may replace execution code within the target application with different execution code during the optimal time only if the deviation from the pre-determined parameters is below the pre-determined threshold.

At least one embodiment may be directed towards a system for executing a computing application within a distributed data environment. The system may include a plurality of clusters. The system may include a plurality of client-devices. The system may include a master-node. The master-node may include executable code. A plurality of name-nodes may include executable code. A plurality of data-nodes may include executable code. The executable code of each name-node may be embodied in non-transitory computer readable medium. The executable code of the master-node may be embodied in non-transitory computer readable medium. The various executable codes, when executed, may be configured to drive executions of a plurality of software applications within a plurality of hierarchical layers. The hierarchical layers may include any combination of the layers previously presented.

A cluster may include a dataset. A cluster may include at least a subset of the plurality of data-nodes. The dataset may include information distributed among a plurality of blocs. A bloc may include memory residing on at least one of the data-nodes.

A cluster may include one of the plurality of name-nodes. Each name-node may be associated with a unique identifier. The master-node may include an index of unique identifiers associated with data locations such as IP addresses. The master-node may utilize the unique identifiers to identify which name-node includes which dataset.

Each name-node may include a processor. The processor may be configured to receive requests for reading access to the dataset. The processor may be configured to reply to requests for reading access to the dataset. The processor may be configured to receive requests for writing access to the dataset. The processor may be configured to reply to requests for writing access to the dataset. The processor may be configured to monitor its own operability. The processor may be configured to monitor operability of each data-node. The processor may be configured to monitor a used capacity of the plurality of blocs. The processor may be configured to monitor an overall capacity of the plurality of blocs. The processor may be configured to instruct the data-node to create blocs in correspondence with a ratio of the used capacity to the overall capacity. The processor may be configured to instruct the data-node to delete blocs in correspondence with the ratio. The processor may be configured to instruct the data-node to replicate blocs in correspondence with the ratio.

A value of the ratio at which the processor instructs the data-node to carry out a replication of one or more blocs may be pre-determined. A value of the ratio at which the processor instructs the data-node to carry out a creation of one or more blocs may be pre-determined. A value of the ratio at which the processor instructs the data-node to carry out a deletion of one or more blocs may be pre-determined. The values of the ratio at which the processor instructs the data-node to carry out the replication, the creation and the deletion may be dynamically determined.

Each client-device may include executable code. The executable code may be embodied in a non-transitory computer readable medium. The code, when executed, may be configured to communicate with the name-node. The code, when executed, may be configured to make requests for reading access to the dataset. The code, when executed, may be configured to make requests for writing access to the dataset. Writing access may be optional.

The master-node may be configured to perform a dynamic software patch installation. The dynamic software patch installation may identify a single target application selected from the software applications. The dynamic software patch installation may create a segment. The dynamic software patch installation may identify an optimal time. The dynamic software patch installation may disable the target application during the optimal time. The dynamic software patch installation may replace execution code within the target application with different execution code during the optimal time.

The target application may include execution code. The segment may define when each of the software applications is directly called, or is called as a result of a direct call to another software application, by the target application over the course of a pre-defined period of time. The segment may also define which of each of the software applications is directly called, or is called as a result of a direct call to another software application, by the target application over the course of a pre-defined period of time. The optimal time may include at least one time interval during which no portion of the segment, other than the target application, will be altered by disabling the target application.

Each application within a segment other than the target application may define a unit. None of the units may be in operation when the execution code is replaced. One or more of the units may be in operation when the execution code is replaced. All the units may be in operation when the execution code is replaced.

The hierarchical layers may include a client facing layer, a runtime layer, a webserver layer, a middleware layer, a database layer, a virtual layer, and operating system layer, a firmware layer, a machine code layer, and any combination thereof. The hierarchical layers may include defined configuration settings. The segment may include the defined configuration settings.

The pre-defined period of time may be within the range of 1 minute to 1 year.

The system may include the dynamic software patch performing a simulation of the replacement of the execution code on all of the units. Performance of replacement of the execution code only occurs if the simulation indicates that all of the units will remain in conformance with pre-determined parameters, such as within a pre-determined range of values of the parameters.

The dynamic software patch may include generating an impact analysis. The dynamic software patch may include issuing the impact analysis. The impact analysis may reflect a magnitude of deviation from the pre-determined parameters the replacement of the execution code would cause. The dynamic software patch may be configured such that the replacement of the code may only occur after receiving an instruction to proceed subsequent to issuing the impact analysis.

The segment may include applications identified by documentation associated with the target application that were not called by the target application over the pre-defined period of time. The segment may include specific hardware components accessed by the target application during the pre-defined period of time. The segment may include specific hardware identified by documentation associated with the target application that were not called by the target application over the pre-defined period of time.

The dynamic software patch may be configured to perform cataloging, predicting and conformance actions. The cataloging may include recording when, over the pre-defined period of time, one or more client-devices interact with the target application. The predicting may include recognizing a time slot having a low probability of a client-device interacting with the target application. The conformance may include matching the optimal time with the time slot.

The units may have defined security settings. The segment may include a record of the units' defined security settings.

The execution code installed by the dynamic software patch may be one item selected from the group consisting of a repaired bug, a closed security hole, an additional client feature, a hardware compatibility alteration, a streamlined code, and any combination thereof.

The dynamic software patch may be configured for performance of: identifying a scheduled time; and conformance of the optimal time with the scheduled time. The scheduled time may be a time when one or more units will be disabled for reasons unrelated to the execution code replacement.

The segment may include a record of data collected from previous replacements of execution code.

Detailed Description of the Disclosure

Definitions

"Device" means any non-transitory logic-using medium or electronics configured for data processing or to transmit user input and process, store, transmit and/or output data; and includes, but is not limited to, personal computers, business computers, laptop computers, tablet devices, computer networks, software applications, web browsers, short message service ("SMS") devices, SMS software, email devices, email software, electronic data devices, cell phones, cell phone applications, firmware, websites, cloud-based processing, internet routers, web servers, computer terminals, personal data assistances, any component thereof, any device integrated with any of the aforementioned, and any combination thereof.

"Real-time" describes an attribute of a process in which data is received, processed and a response is issued within a discrete deadline time constraint. The deadline may range from between 0.0001 microseconds and 10 seconds.

"Client" means a specific software or hardware device operating within the distributed data environment.

"User" means a specific application and/or a human interacting with the distributed data environment.

"Configuration" means a record of the arrangement of some or all of the functional units of the distributed data environment according to their nature, number, and/or chief characteristics. The functional units may include the specific types of hardware (including, but not limited to, the name-nodes, data-nodes, and master-node of a distributed data environment), software, firmware and documentation, as well as selected settings of variable operating parameters.

"Target application" means a specific software application including an older or legacy version of execution code for which a portion of the execution code may be replaced with a newer version of execution code.

Embodiments

At various points in the lifecycle of a software application, it may become advantageous to update execution code of the software application. In such a circumstance, a patch is inserted within the software application, the patch usually replacing some, but not all, of the execution code of that application. Patching may be done for numerous reasons. This can include circumstances in which: the software application has a defect or bug that requires repair; the application requires updated or different drivers to continue operations due to changes in ancillary hardware or software; the patch redresses discovered or newly created security threats to the application; the patch improves the stability of software operations; and/or the patch upgrades or improves the software's functionalities or capabilities.

Installing a software patch is far more complex than the mere replacement of one set of execution code with another. First, a stored version of the old execution code needs to be replaced with a stored version of the new execution code. Second, an active running version of the execution code (typically in RAM or some other memory location on a device) needs to replace an older version of the active running version of the execution code. At a minimum, this requires a period when the old active version of the execution code is deactivated, and an updated version of the execution code goes active. This may also involve deactivating the active version while the stored new execution code is installed.

Upon considering the effects of patching a target software application upon the numerous other software applications that interact with or rely upon the target application, the patching process can be seen to be quite complex. In many systems, and especially in distributed data environments, an active software application is an integral part of a complex web of simultaneously operating applications. Changes in one portion of the web may induce changes or problems in other portions of this web. As a result, patching often involves taking offline far more of a computer system than the single application targeted for the patch. In standard practice, such patching often involves disabling or deactivating a plurality, majority and/or the entirety of a computer system. In an embodiment of the invention, the patching process minimizes the extent of system disablement or deactivation.

Figure 1:
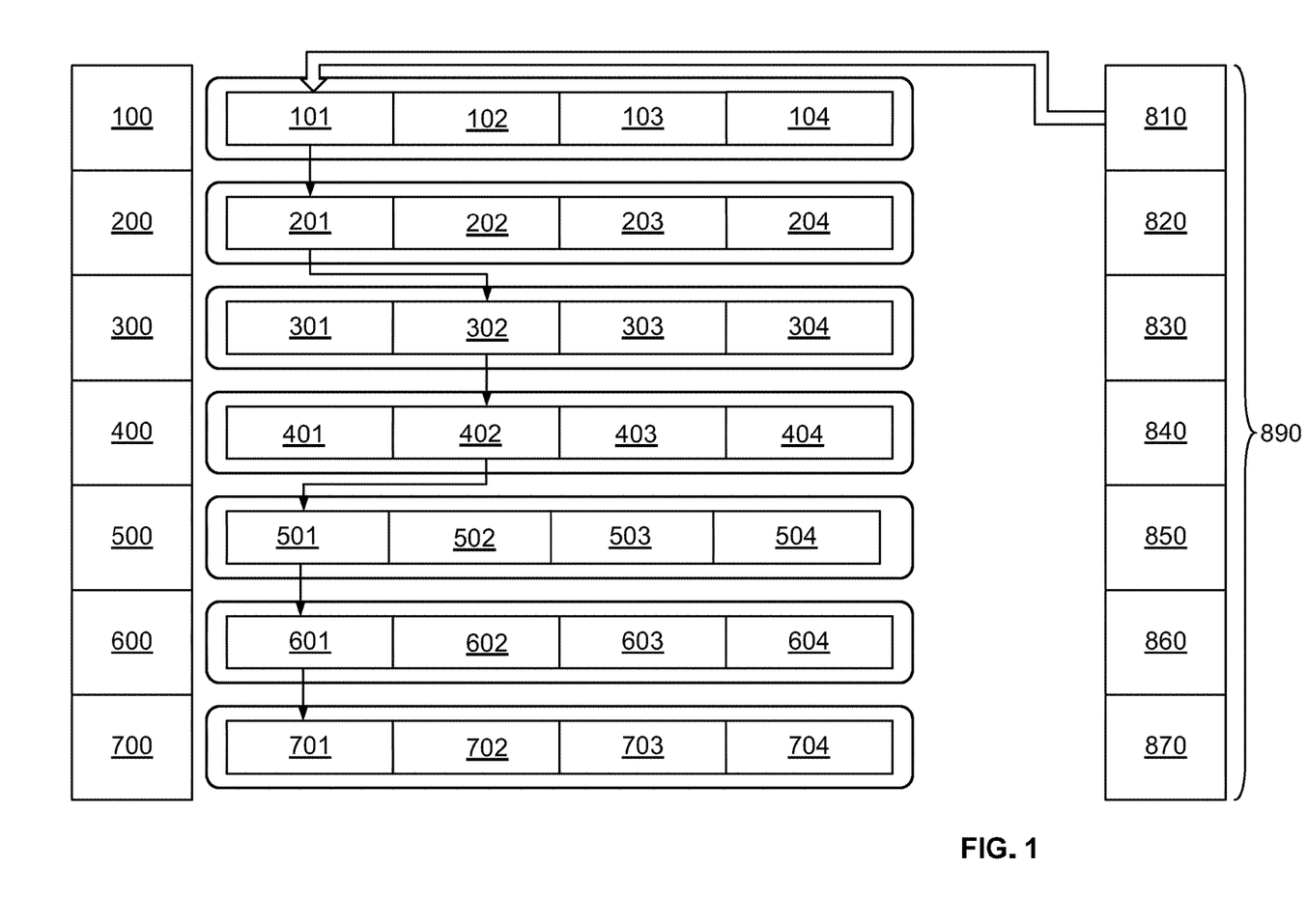
FIG. 1 is a first drawing illustrating a patching operation occurring in a hierarchical environment.

As illustrated in FIG. 1, the web of applications in which a patch occurs can be characterized as having parallel attributes and hierarchical attributes. While FIG. 1 illustrates the various layers in a specific order, it is understood that the layers may be arranged according to different arrangements, sequences, orders, and geometries. In addition, some or all of one or more of the applications illustrated in FIG. 1 may coexist in more than one hierarchical layer. Parallel attributes involve more than one application in operation which manifest the same level of access. At a simple level, if one views the user-facing manifestations of a computer system 900 as a first layer 100, then simultaneous operation of different user-facing applications (for example 101, 102, 103, and 104) could be examples of parallel applications operating on the same hierarchical layer. Representative examples of parallel user-facing applications operating on a given hierarchical layer may include a human user operating a word processor application, a spreadsheet application, and a web browser application simultaneously on a given device, such as a client-device.

Each of these parallel applications, in the normal course of its operation, may in turn interact with either each other and/or with other applications occupying a different layer of the system. For example, one or more of the user-facing applications of layer 100 may access libraries (such as dynamic link libraries), function calls, operating system calls, and other resources. As these resources are not directly accessed by the users, they occupy a different hierarchical layer.

In an embodiment, the call between one or more applications over one or more layers is accomplished by the use of an API (application programming interface). An API is a set of subroutine definitions, protocols, and tools that utilize a set of clearly defined methods of communication between various software components of different software applications.

In an embodiment, a second layer of system 900 is a runtime layer 200. Runtime layer 200 may be a series of software applications (for example 201, 202, 203, and 204) operating on system 900. The series may not be a direct component of a client facing application. The series may not be an application operating on a different device. In an embodiment, the runtime layer includes applications that manage system resources to support parallel operations (such as stack-based memory allocation, heap-based memory allocation, and dynamic memory allocation) and maintains a call stack where the requests and results of individual data requests of the parallel applications reside. The runtime layer may also include applications executing jobs in a job queue, calculating job priority, calculating job execution time, and positioning jobs within a job queue. Runtime layer applications may also include applications configured to operate storage drives, keyboards, mice and other hardware-software and input-output interfaces. In an embodiment, the runtime layer includes all applications operated by an operating system other than those involved in the boot up or power down sequences of a given device.

Figure 2:
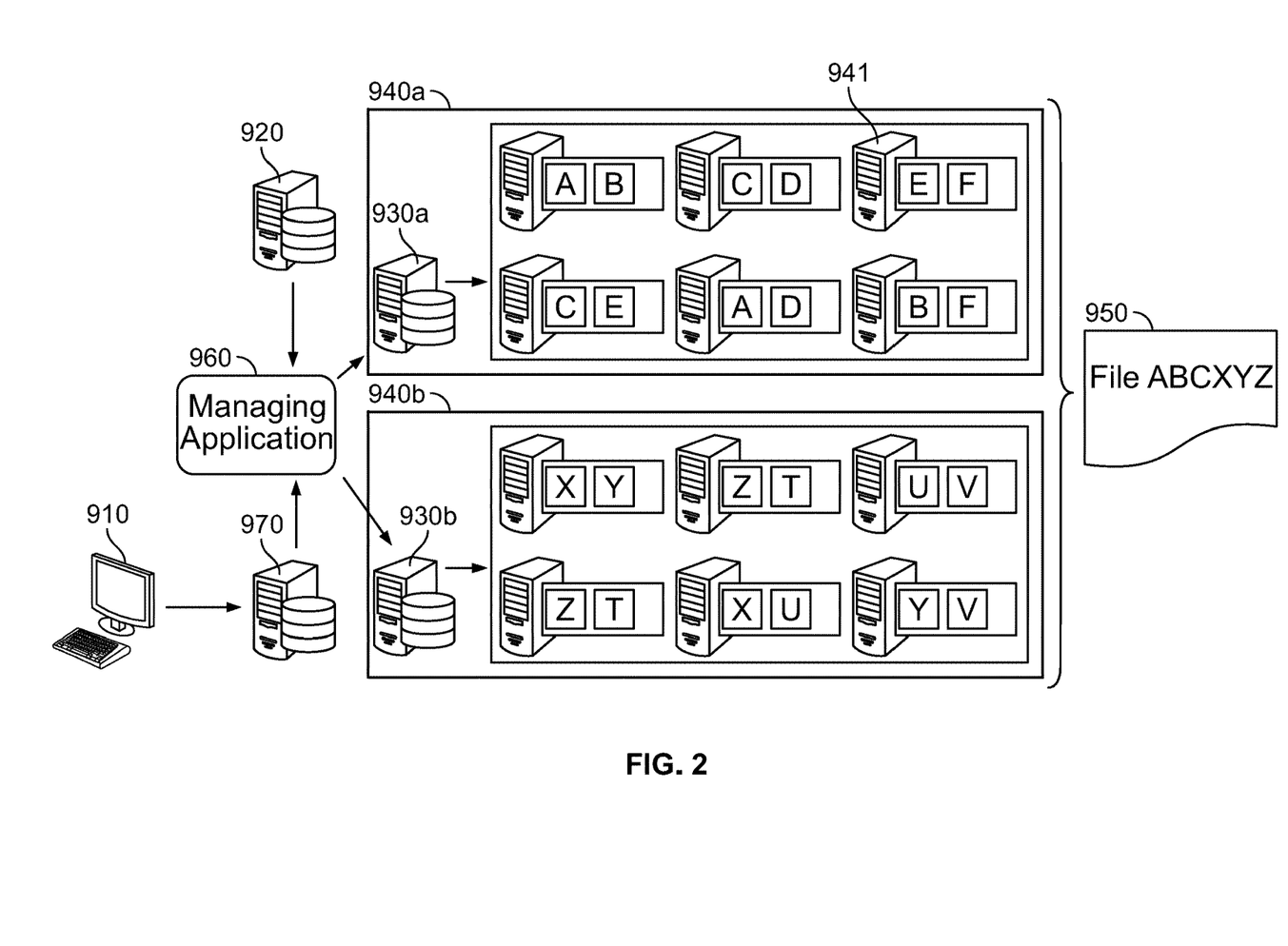
FIG. 2 is a second drawing illustrating a patching operation on a distributed data environment.

In an embodiment, some of the hierarchical layers span over various portions of a distributed data environment. As illustrated in FIG. 2, a distributed data environment is a network of multiple devices (for example 910, 970, 930*a*, and 930*b*) designed to accommodate data sets 950 that are too large, cumbersome, or otherwise distributed, to be housed on a single device. In a distributed data environment, a client such as client-device 910 interacts, directly or indirectly, with a master-node 920. Master-node 920 runs a managing application 960 that, in turn, facilitates navigation among the numerous devices upon which the data resides. This navigation may be accomplished using an index, accessible by managing application 960, which associates categories of the data with the addresses or locations of the various devices. The various devices may be interconnected over a local area network, over a wide area network, over the internet, and/or over any combination thereof. One or more additional devices 970 may supplement or mediate the interaction between the client-device 910 and any other functional unit of the distributed data environment.

In a distributed data system, data sets 950 are usually distributed among clusters (for example 940*a* and 940*b*) that include name-nodes (for example 930*a* and 930*b*) and data-nodes 941. Each data-node 941 is a device that physically houses a portion of data of data sets 950. The memory resources of data-nodes 941 are divided into blocs and the data is divided among the various blocs of the various clusters. The name-nodes manage the allocation of chunks of data within the blocs. The name-nodes also manage the allocation of blocs within the data-nodes of a given cluster. The name-nodes also handle input-output and read-write requests of the data and distribute duplicate copies of the data to prevent loss due to a malfunctioning data-node. In short, in a distributed data environment, for a client-device to access data, it communicates with a master-node that, in turn, directs the client-device to a specific name-node that, in turn, directs the client-device to the data-node of a cluster that houses the data the client wishes to access.

Referring again to FIG. 1, it is shown that, in an embodiment, one of the hierarchical layers is a middleware layer 300 of a distributed data environment. Numerous software applications (for example 301, 302, 303, and 304) operate to facilitate communications between a user-facing device (such as a client-device) and data housed within a cluster. Representative examples of middleware layer 300 software applications include, but are not limited to, enterprise integration applications (such as services that automate communications between specific clusters for specific uses such as human resources, sales, supply chain management, managing customers, business intelligence applications and payroll, data integration applications (that operate to ensure that data stored in different clusters are kept consistent), MOM applications (message-oriented middleware that facilitates sending and receiving messages between potentially dissimilar platforms within a distributed data system), ORB applications (object request brokers that facilitate program calls to be made from one device to another device by directing communications to specific known software objects within those devices), ESB applications (enterprise service bus that facilitates communications between multiple simultaneously operating software applications), and any combination thereof.

In an embodiment, one of the hierarchical layers is a web server layer 400. Numerous software applications (for example 401, 402, 403, and 404) operate on a specific device that interacts with a user-facing device (such as a client-device) only after communication over the internet. Representative examples of web server layer 400 software applications include, but are not limited, to security authentication applications, access control applications, virtual hosting applications, gateway interface applications, dynamic content applications (such as Java and other servlet applications), webpage script applications, kernel space applications, protocol formatting applications such as various versions of HTTP, and any combination thereof.

In an embodiment, one of the hierarchical layers is a database layer 500. In database layer 500, numerous software applications (for example 501, 502, 503, and 504) may operate on a specific device that facilitate access, review, and update of specific pieces of information in a rapid and coherent manner. Representative examples of database layer 500 software applications include, but are not limited to, analytical database software that pulls information from a variety of sources (including, but not limited to, distributed data environment clusters) and examines the information quantitatively, data warehouse applications that pull data from a variety of databases and stores them in a central location for the purpose of deriving particular insights in the data, data integrity applications that identify inconsistencies in data warehouses, distributed database software that controls information stored in a variety of locations, and database interfaces that pass information from the database layer to user-facing applications such as spreadsheets and query applications.

In an embodiment, one of the hierarchical layers is an operating system layer 600. The operating system may be of the user's device or of another device (for example one or more of the devices of a distributed data environment). In operating system layer 600, numerous software applications (for example 601, 602, 603, and 604) operate on a specific device that manages the hardware and software resources for all other applications operating on that specific device. Representative examples of database layer 600 software applications include, but are not limited to, kernels (that have complete control over everything in the system and usually reside in a reserved memory location that other applications cannot access), execution applications (that assign memory space and other resources, and activate other applications), interrupt applications (that react to particular circumstances by suspending active applications and shifting resources elsewhere), multitasking applications (that utilize time-sharing and asynchronous processing to operate multiple applications simultaneously), driver applications (that facilitate interaction with hardware devices), and user interface applications (that are shells that acquire data from input hardware devices, such as a keyboard, mouse or credit card readers, and that pass on the acquired data to appropriate applications, displaying prompts and status messages to users soliciting such inputs), and any combination thereof.

In an embodiment, one of the hierarchical layers is a virtual layer 700. In virtual layer 700, numerous software applications (for example 701, 702, 703, and 704) may operate over multiple devices to facilitate the multiple devices emulating their operation as a single storage device. This may be performed via a cluster arrangement of the distributed data environment or via another arrangement. Representative examples of virtual layer 700 software applications include, but are not limited to, paging applications (that divide available memory resources into blocs available for data storage), table applications (that store data addresses of specific pieces of hardware used to locate various blocs), supervisor applications (that keep track of backups of data, update addresses in tables to redirect to the backups in the event of a bloc fault, and also keep track of number of blocs available for use), swapping applications (that move data sets between different blocs for various reasons), and any combination thereof.

In an embodiment, one or more patches (for example 810, 820, 830, 840, 850, 860, and 870) are applied to one or more target applications. The patches may be applied individually or as a batch process 890 that includes multiple replacements of code sections of one or more software applications. In the example in FIG. 1, in its normal operation, target application 101 in layer 100 interacts with runtime layer application 201, which in turn interacts with middleware layer application 302, which in turn interacts with webserver layer application 402, which in turn interacts with database layer application 501, which in turn interacts with operating system layer application 601, which in turn interacts with virtual layer application 701. As a result, patching the target layer application 101 (as by installation of patch 810 or by running batch process 890), could impact each of these other applications in the different layers. As a result, patching the target application may require that all of these affected applications be offline during the patching process.

Figure 3:
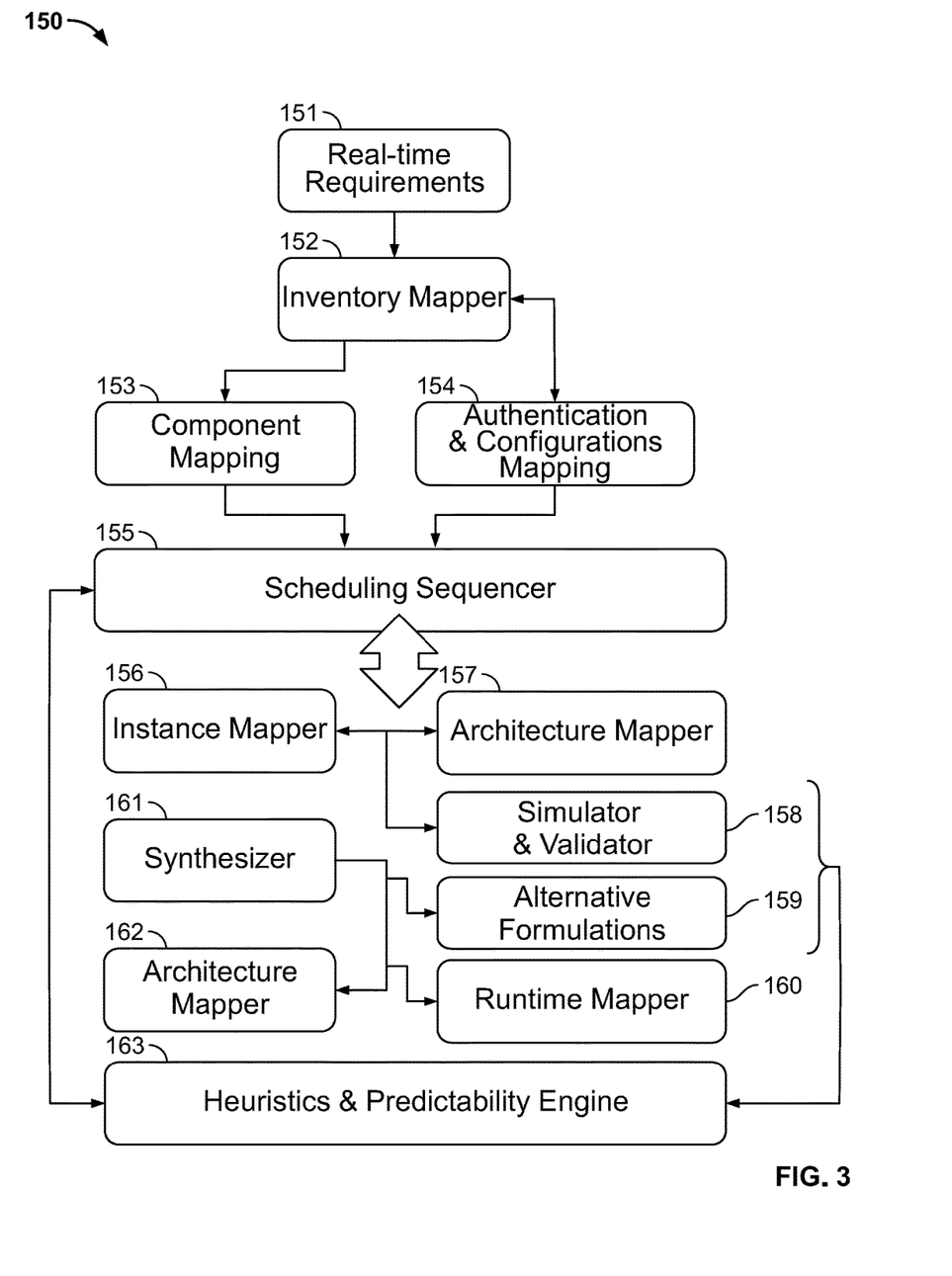
FIG. 3 is a third drawing illustrating a logic flowchart for an improved patching operation.

In an embodiment, as illustrated in FIG. 3, an apparatus implementing a process 150 is used to improve patching of a target application. The process uses a model to identify the full segment involved in the patch of a target application. As previously described, the segment includes all of the units that are affected by the operation of a given application. As previously described, the units include all the real-time requirements 151 of the target application's activity. Real-time requirements 151 include the hardware and software applications that the target application interacts with during normal operations.

In an embodiment, at least a portion of the units of the segment are identified by using an inventory mapper 152. Inventory mapper 152 is an application that collects information identifying real-time requirements 151 of the target application's activity. In an embodiment, inventory mapper 152 accomplishes this by collecting log information from various archives generated by various applications. In an embodiment, the logs are generated by applications in a different hierarchical layer than the target application or affected application(s). In an embodiment, real-time requirements 151 are identified by noting API calls or other calls and correlating the calls with specific hardware and software resources. The correlation may involve time relationships (for example, they may both be accessed at the same time or within 0.0001 to 100 seconds of each other, or more time, or less time) and/or share reciprocal IP addresses.

In an embodiment, real-time requirements 151 are identified by creating an emulation shell within which the target application is run, and the emulation shell detects all calls made by the target application and affected applications. The emulation shell may also include a simulation of each called application and note each call the called applications generate. In an embodiment, the emulation shell may operate on a device other than the device where the patch will be installed. In an embodiment, the emulation shell may operate on a device outside of the distributed data environment. In an embodiment, the emulation shell may operate on a device that does not communicate with the device where the patch will be installed. In an embodiment, the emulation shell may operate on a device that does not transmit communications to the distributed data environment. In an embodiment, the emulation shell may operate on a device that receives communications from the distributed data environment.

In an embodiment, at least a portion of the units of a segment are identified by evaluations of meta-data. Meta-data is data associated with information that provides descriptive attributes of data. Three distinct types of meta-data items exist: descriptive meta-data, structural meta-data, and administrative meta-data. The search for segment units may involve perusing all three types of meta-data for the affirmation.

Descriptive meta-data describes information associated with discovery and identification. It can include elements such as title, abstract, author, and keywords. Structural meta-data is meta-data describing information associated with containers of data and indicates how compound objects were put together, for example, how pages are ordered to form chapters. It includes the types, versions, relationships and other characteristics of digital materials. Administrative meta-data describes information associated with managing resources, such as when, where, and how a file was created; file type; and other technical information; and who can access the file.

In an embodiment, files generated by the target application may include meta-data tags identifying other applications that the target application interacts with. Similarly, files generated by other applications during or after the operation of the target application, may include meta-data indicating a relationship between the applications. Scrutiny of such meta-data may identify the identity and scope of applications that interact with the target application.

In an embodiment, component mapping 153 maps those hardware components interacted with by the target application. In an embodiment, authentication & configuration mapping 154 maps authentication levels and configuration settings required by the target application. After identifying the hardware and software requirements, an intelligent strategy for implementing the patch can be scheduled and formulated by sequencer 155. An instance mapper 156 and an architecture mapper 157 can create a simulation of the target application with simulator & validator 158 that can operate to measure the impact the patch will have on each of the affected software applications and hardware.

Various alternative formulations 159 of the patch installation are modelled in which one, some, all, or none of the target application, affected software applications, and affected hardware are disabled or deactivated while the patch is installed. A synthesizer 161 may simulate the impact of various permutations of software applications activity or deactivation. A runtime mapper 160 keeps track of all the units active and not active at various points in time during the modeled patch installation. An architecture mapper 162 simulates the effect of the various permutations of activity or deactivation of various pieces of hardware. A heuristic & predictability engine 163 takes those various permutation inputs, and optional other considerations, into account to generate an ideal strategy for implementing installation of the patch to the target application.

In an embodiment, heuristic & predictability engine 163 is in operation for a pre-determined period of time and evolves its strategy as it acquires additional information. The period of time may be within a range extending from 1 minute to 1 year, or shorter, or longer. In an embodiment, heuristic & predictability engine 163 calculates the impact of multiple patches and develops a strategy for implementing the multiple patches.

Figure 4:
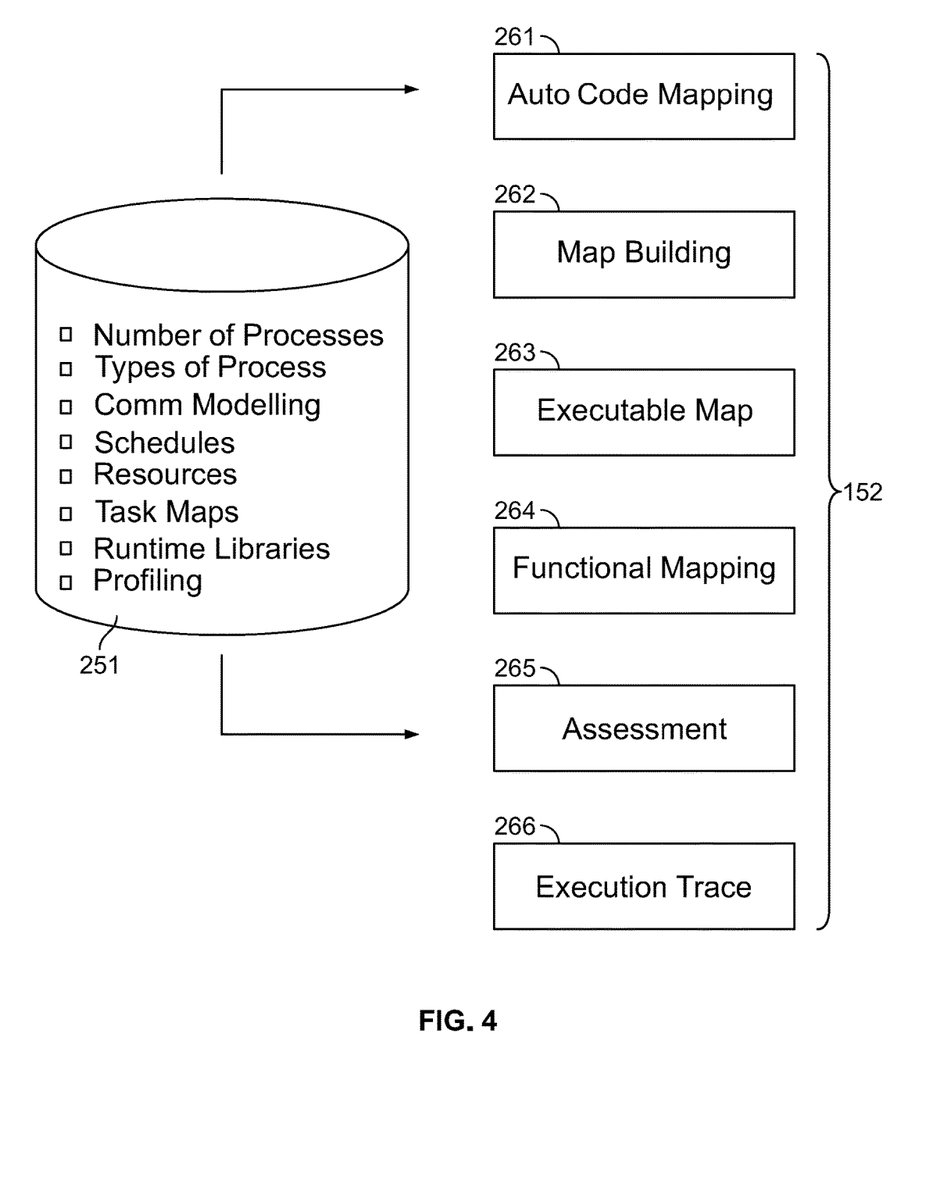
FIG. 4 is a fourth drawing illustrating resources and processes utilized in an improved patching operation.

Referring to FIG. 4, there are shown some of the inventory of data inputs 251 used by the inventory mapper 152 to identify all of the units present in a segment. These data inputs include the number of applications involved, the types of applications involved, models of the communication operating among the involved applications, the schedule of use of each of the applications involved, the resources (memory, electricity, time on specific devices, license fees, opportunity costs) utilized by the applications involved, the tasks that the involved applications are involved in carrying out, the libraries that are called on by the involved applications, and the profiles (previously archived attributes such as manufacturer documentation or user discovered values) of the involved applications. These inputs are collected automatically via auto-code mapping 261 over the pre-determined period of time from various data sources. During or after the collection at 261, inputs 251 may be used for map building 262 of all the applications among the various layers that must be running for the target application to run. Map building 262 may produce an executable map 263 listing various actions other than activating or deactivating applications or hardware. These may include changes in some or all of the security settings, authentications, and system configurations that must be in place when the target application is run and that must be in place to patch the target application.

Functional mapping 264 includes criteria other than those directly involved in actual operation of the target application. For example, those criteria may include an evaluation of the reported vulnerabilities or security threats against input inventory 251 that the proposed patch may impact. Additional criteria may include calculation of loss of productivity, goodwill, or revenue; the opportunity cost inherent in deactivating some or all of the impacted applications; and any combination thereof.

An impact assessment 265 is then performed. Assessment 265 may weigh the specific impacts of different patching strategies and of time for performing them to identify an ideal or best-case patching strategy, a strategy of best constrained optimality. Assessment 265 may also utilize multiple cost-benefit evaluations to categorize and rate various patching strategies. For example, values may be assigned to the likelihood of a failure or security breach if the patch is not implemented over time versus the likelihood of loss of operation, customer dissatisfaction, loss of reputation or goodwill, loss of sales versus the various possible patching times or other strategies. These values may be used to identify the ideal or best-case time and strategy for implementing a patch. An execution trace 266 may be operated as the patch is in fact implemented, to obtain additional inputs that may be used by heuristic & predictability engine 163 (shown in FIG. 3) to plot strategies for future patch installations.

Figure 5:
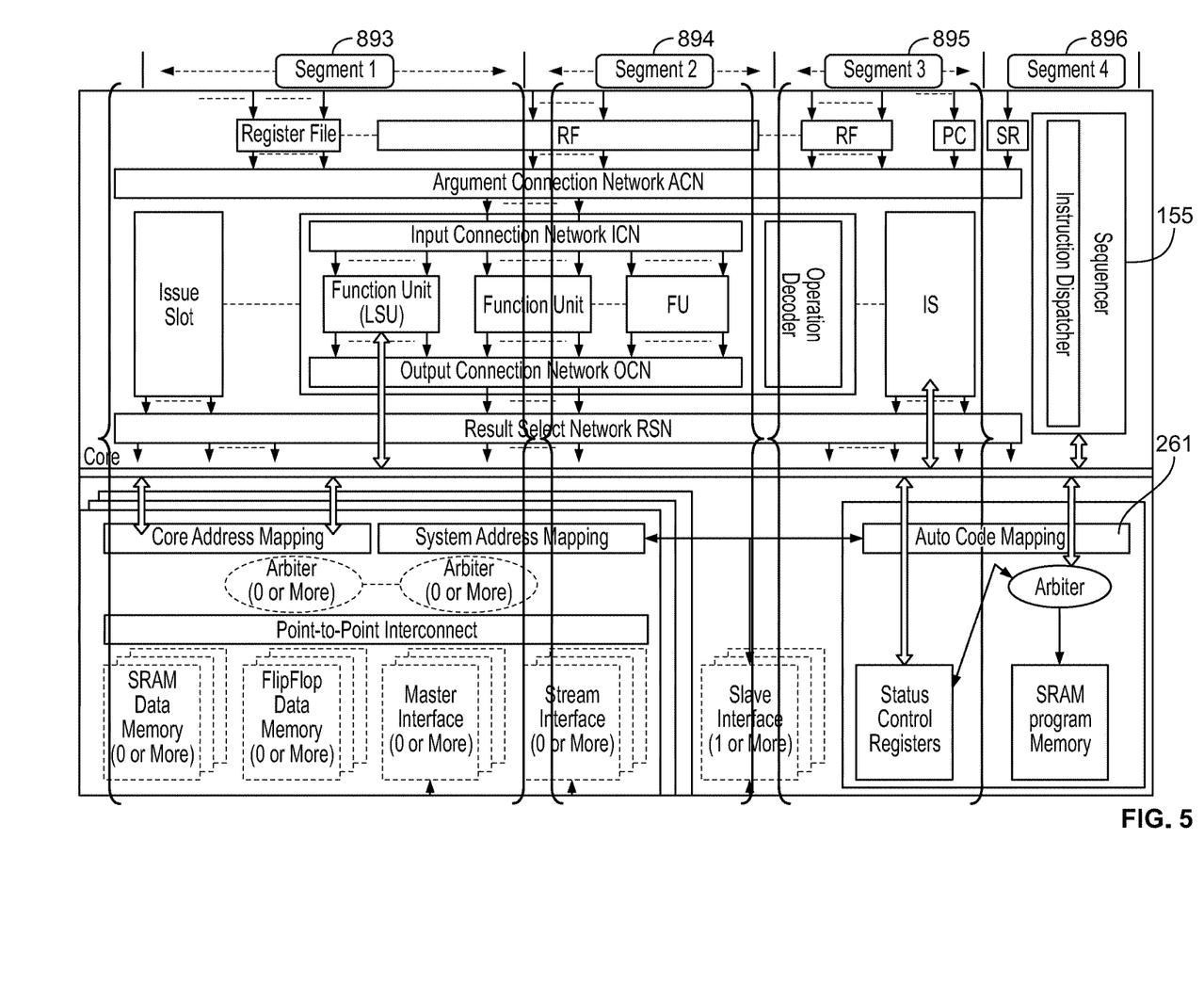
FIG. 5 is a fifth drawing illustrating an improved patching operation in a distributed data environment.

FIG. 5 illustrates four examples of segments that are identified in a distributed data environment. One or more segments (for example 893, 894, 895, and 896) are identified by a mapping application. Each segment defines the specific units that interact with a target application over the course of its operation. The units may include one or more, or only a portion of one or more, specific applications, specific memory locations, specific pieces of hardware, specific components or objects within applications, and may be on the same or different devices than the target application. The various units may be parallel applications operating within the same hierarchical layer or the various units may be applications operating on different hierarchical layers.

Sequencer 155 keeps track of the sequence of units involved in the operations of the target application and adds those units to the segment. This includes specific hardware and software applications as well as the communication connections and protocols interconnecting them. Auto code mapping 261 keeps track of units' locations including system address locations, status control register addresses, SRAM (static random-access memory) locations, and flip-flop latch data storage locations.

Using a dynamic patching process allows for proper determination of risks, benefits, and other factors associated with various possible permutations for how exactly to implement a patch. This identification allows for the deployment of an ideally subtle and sophisticated patching strategy. Such subtlety and sophistication facilitate patching processes that may impose the least possible disruption to a system while also assuring efficient and effective implementation of the patch.

Figure 6:
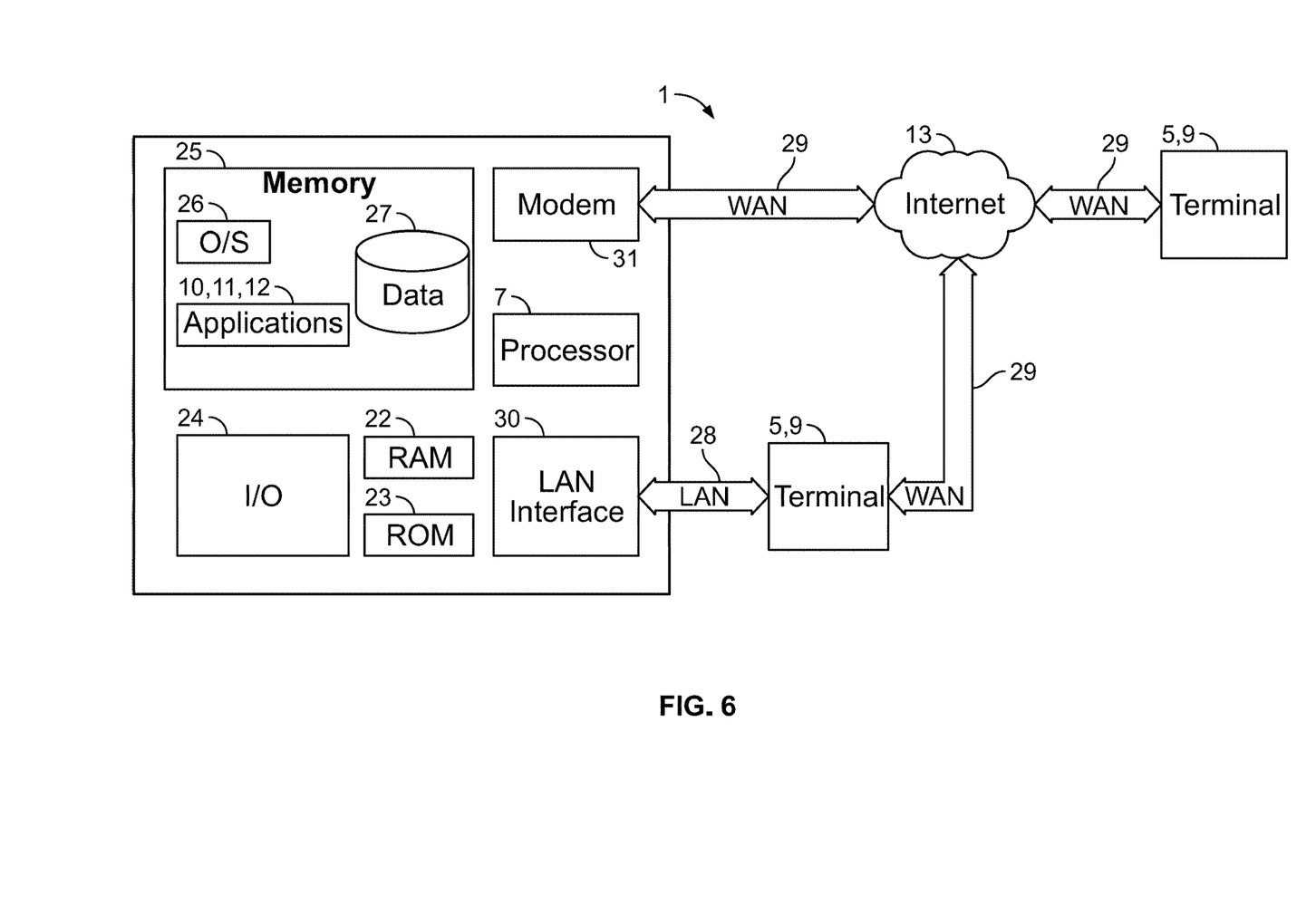
FIG. 6 is a sixth drawing illustrating software and hardware suitable for a use in a patching operation.

Any one, some, or all the constituents of the system, target application, patch installing application, interacting application, including some or all of a distributed data environment, including any or all of its services, nodes, clusters, blocs, and constituents thereof, may manifest within one or more computer systems. As illustrated in FIG. 6, the computer system 1 may have a processor 7 for controlling the operation of associated components, and may include RAM 22, ROM 23, input/output modules 24 and a memory 25. Processor 7 may also execute all software running on the computer—e.g., operating system 26, consent and authorization applications 10, 11, 12. Other components commonly used for computers such as EEPROM or Flash memory or any other suitable components may also be part of the computer system.

The memory of the computer system may include any suitable permanent storage technology—e.g., a hard drive or cloud based storage. The memory stores software, including operating system 26, any application(s) 10, 11, 12, and data 27 needed for the operation of the computer system. Alternatively, some or all of computer executable instructions may be embodied in hardware or firmware. The computer executes the software instructions to perform various functions.

The computer system may be connected to other computer systems via a local area network (LAN) 28, a wide area network (WAN) 29, or other network arrangement. The system may operate in a networked environment supporting connections to one or more remote computers, such as terminals 5, 9, personal computers, or servers that include many or all of the elements described above relative to system. The network may be interconnected via modems 31 interfaces 30 or other communication medium including the internet 13.

It will be appreciated that any known network connections or other means of establishing a communications link among the computers may be used. The existence of any of various well-known protocols such as TCP/IP, Ethernet, FTP, HTTP and the like is presumed, and the system can be operated in a client-server configuration to permit a user to retrieve applications such as web pages from a web-based server. Any of various conventional web browsers can be used to display and manipulate data on web pages.

The computer system may also include one or more of the following components: I/O circuitry that may include a transmitter device and a receiver device and that may interface with fiber optic cable, coaxial cable, telephone lines, wireless devices, PHY layer hardware, a keypad/display control device or any other suitable encoded media or devices; peripheral devices that may include counter timers, real-time timers, power-on reset generators or any other suitable peripheral devices; and logical processing device that may compute data structural information or structural parameters. Components of the computer system may be coupled together by a system bus or other interconnections and may be present on one or more circuit boards. In some embodiments, the components may be integrated into a single chip. The chip may be silicon-based.

The computer system may be used to engage in an activity which includes but is not limited to locking or unlocking a lock, activating or deactivating a motor, activating or deactivating and electrical circuit, inputting or draining a chemical in a reactor, activating a refrigerator, deactivating a refrigerator, printing a document, shredding a document, opening a door, closing a door, elevating an elevator, descending an elevator, illuminating a light source, de-illuminating a light source, and any combination thereof.

While this invention may be embodied in many different forms, there are described in detail herein specific preferred embodiments of the invention. The present disclosure is an exemplification of the principles of the invention and is not intended to limit the invention to the particular embodiments illustrated. All patents mentioned herein or mentioned, are incorporated by reference in their entirety. Furthermore, the invention encompasses any possible combination of some or all of the various embodiments described herein and/or incorporated herein. In addition, the invention encompasses any possible combination that also specifically excludes any one or some of the various embodiments described herein and/or incorporated herein.

The above disclosure is intended to be illustrative and not exhaustive. This description will suggest, many variations and alternatives to one of ordinary skill in this art. All the alternatives and variations are intended to be included within the scope of the claims where the terms "comprising," and "including" mean "comprising/including, but not limited to". Those familiar with the art may recognize other equivalents to the specific embodiments described herein which equivalents are also intended to be encompassed by the claims.

Those skilled in the art may recognize other equivalents to the specific embodiment described herein which equivalents are intended to be encompassed by the claims attached hereto.

What is claimed is:

1. A method for executing a computing application within a distributed data environment, the distributed data environment comprising a plurality of clusters, a plurality of client-devices, and a master-node, each of the master-node, a plurality of name-nodes, each of the plurality of name-nodes further including a processor, and a plurality of data-nodes including executable code embodied in non-transitory computer readable medium, the code, when executed, configured to drive executions of a plurality of software applications within a plurality of hierarchical layers; wherein: each cluster comprises one of the plurality of name-nodes, at least a subset of the plurality of data-nodes, and a dataset including information distributed among a plurality of blocs, each bloc including memory residing on at least one of the data-nodes, the method comprising:

using each of the processors included each of the name-nodes to:
receive, and reply to, requests for reading access and writing access to the dataset,
monitor its own operability and operability of each data-node with which it is associated,
monitor a used capacity and an overall capacity of the plurality of blocs, and
instruct the at least one of the plurality of data-nodes of the cluster to create, delete, or replicate blocs in correspondence with a ratio of the used capacity to the overall capacity, wherein each client-device includes executable code embodied in a non-transitory computer readable medium, the code, when executed, configured to communicate with a name-node of a cluster and make requests for reading access, and optionally for writing access, to the dataset of a cluster; and performing, using the master-node, a dynamic software patch installation, the performing that includes:
identifying a single target application selected from the software applications, the target application comprising execution code;
creating a segment, the segment including when, and which of, each of the software applications is directly called, or is called as a result of a direct call to another software application, by the target application over a pre-defined period of time;
identifying an optimal time including at least one time interval during which no portion of the segment, other than the target application, will be altered by disabling the target application;
disabling the target application during the optimal time; and
replacing execution code within the target application with different execution code during the optimal time.

2. The method of claim 1 wherein each application within the segment other than the target application defines a unit.

3. The method of claim 2 wherein all units are in operation when the execution code is replaced.

4. The method of claim 1 wherein the hierarchical layers include at least one item selected from the group consisting of a client facing layer, a runtime layer, a webserver layer, a middleware layer, a database layer, a virtual layer, and operating system layer, a firmware layer, a machine code layer, and any combination thereof.

5. The method of claim 1 wherein the pre-defined period of time is within a range of between about one minute to about one year.

6. The method of claim 1 wherein the master-node is further configured to perform a simulation of an effect of replacement of the execution code in all units of the segment, wherein the replacement of the execution code occurs when the simulation indicates that all of the units of the segment will remain in conformance with pre-determined parameters.

7. The method of claim 6 wherein the master-node is further configured to:
generate an impact analysis reflecting a magnitude of deviation from the pre-determined parameters the replacement will cause;
issue the impact analysis; and,
after receiving an instruction to proceed subsequent to issuing the impact analysis, execute the replacement.

8. The method of claim 1 in which the segment further includes applications identified by documentation associated with the target application that were not called by the target application over the pre-defined period of time.

9. The method of claim 1 wherein the segment further includes a specified plurality hardware components accessed by the target application during the pre-defined period of time.

10. The method of claim 1 wherein the master-node is further configured to:
catalog when, over the pre-defined period of time, one or more client-devices interact with the target application;
predict a time slot having a low probability of a client interacting with the target application; and
conform the optimal time with the time slot.

11. The method of claim 1 in which at least some of the hierarchical layers comprise defined configuration settings and the segment further includes the defined configuration settings.

12. The method of claim 11 in which at least some of the units have defined security settings and the segment further comprises the defined security settings.

13. The method of claim 1 in which the different execution code is one item selected from the group consisting of a repaired bug, a closed security hole, an additional client feature, a hardware compatibility alteration, a streamlined code, and any combination thereof.

14. The method of claim 2 wherein the master-node is further configured to:
identify a scheduled time; and
conform the optimal time with the scheduled time;
wherein the scheduled time is a time when one or more units will be disabled for reasons unrelated to an execution code replacement.

15. The method of claim 1 wherein the segment further includes data collected from previous replacements of execution code.

16. A system for executing a computing application within a distributed data environment, the system comprising:
a plurality of clusters, a plurality of client-devices, and a master-node, each of the master-node, a plurality of name-nodes, and a plurality of data-nodes including executable code embodied in non-transitory computer readable medium, the code, when executed, configured to drive executions of a plurality of software applications within a plurality of hierarchical layers;
wherein:
each cluster comprises one of the plurality of name-nodes, at least a subset of the plurality of data-nodes, and a dataset including information distributed among a plurality of blocs, each bloc including memory residing on at least one of the data-nodes;
each of the plurality of name-nodes includes a processor configured to:
receive, and reply to, requests for reading access and writing access to the dataset,
monitor its own operability and operability of each data-node,
monitor a used capacity and an overall capacity of the plurality of blocs, and
instruct the at least one of the plurality of data-nodes of the cluster to create, delete, or replicate blocs in correspondence with a ratio of the used capacity to the overall capacity;
each client-device includes executable code embodied in a non-transitory computer readable medium, the code, When executed, configured to communicate with a name-node of a cluster and make requests for reading access, and optionally for writing access, to the dataset of a cluster;
the master-node is configured to perform a dynamic software patch installation that:
identifies a single target application selected from the software applications, the target application comprising execution code;
creates a segment, the segment including when, and which of each of the software applications is directly called, or is called as a result of a direct call to another software application, by the target application over the course of a pre-defined period of time,
identifies an optimal time including at least one time interval during which no portion of the segment, other than the target application, will be altered by disabling the target application;
wherein the master-node is further configured to:
catalog when, over the pre-defined period of time, one or more client-devices interact with the target application;
predict a time slot having a low probability of a client interacting with the target application; and
conform the optimal time with the time slot.

17. The system of claim 16 wherein each application within the segment other than the target application defines a unit.

18. The system of claim 16 wherein the hierarchical layers include at least one item selected from the group consisting of a client facing layer, a runtime layer, a webserver layer, a middleware layer, a database layer, a virtual layer, and operating system layer, a firmware layer, a machine code layer, and any combination thereof.

19. The system of claim 16 wherein the pre-defined period of time is within a range of about one minute to about one year.

20. The system of claim 16 wherein the master-node is further configured to disable the target application during the optimal time and replace execution code within the target application with different execution code during the optimal time.

21. A system for executing a computing application within a distributed data environment, the system comprising:
a plurality of clusters, a plurality of client-devices, and a master-node, each of the master-node, a plurality of name-nodes, and a plurality of data-nodes including executable code embodied in non-transitory computer readable medium, the code, when executed, configured to drive executions of a plurality of software applications within a plurality of hierarchical layers;
wherein:
each cluster comprises one of the plurality of name-nodes, at least a subset of the plurality of data-nodes, and a dataset including information distributed among a plurality of blocs, each bloc including memory residing on at least one of the data-nodes;

each of the plurality of name-nodes includes a processor configured to:

receive, and reply to, requests for reading access and writing access to the dataset, monitor its own operability and operability of each data-node, monitor a used capacity and an overall capacity of the plurality of blocs, and instruct the at least one of the plurality of data-nodes of the cluster to create, delete, or replicate blocs in correspondence with a ratio of the used capacity to the overall capacity;

each client-device includes executable code embodied in a non-transitory computer readable medium, the code, when executed, configured to communicate with a name-node of a cluster and make requests for reading access, and optionally for writing access, to the dataset of a cluster;

the master-node is configured to perform a dynamic software patch installation that:

identifies a single target application selected from the software applications, the target application comprising execution code;

creates a segment, the segment including when, and which of, each of the software applications is directly called, or is called as a result of a direct call to another software application, by the target application over the course of a pre-defined period of time, identifies an optimal time including at least one time interval during which no portion of the segment, other than the target application, will be altered by disabling the target application;

wherein the master-node is further configured to:

to perform a simulation of effects of a replacement of the execution code in all units of the segment, wherein the replacement of the execution code occurs when the simulation indicates that all of the units of the segment will remain in conformance with pre-determined parameters;

to generate an impact analysis reflecting a magnitude of deviation from the pre-determined parameters the replacement will cause;

to issue the impact analysis; and, after receiving an instruction to proceed subsequent to issuing the impact analysis, to execute the replacement.

\* \* \* \* \*